US005918047A

United States Patent [19]
Leavitt et al.

[11] Patent Number: 5,918,047
[45] Date of Patent: Jun. 29, 1999

[54] INITIALIZING A PROCESSING SYSTEM

[75] Inventors: Thomas P. Leavitt, Temple; Kevin D. Davis, Belton, both of Tex.

[73] Assignee: Texas Instruments Incorporated, Dallas, Tex.

[21] Appl. No.: 08/787,560

[22] Filed: Jan. 22, 1997

[51] Int. Cl.⁶ ................................................. G06F 9/445
[52] U.S. Cl. ............................................................ 395/652
[58] Field of Search ..................................... 395/651, 652

[56] References Cited

U.S. PATENT DOCUMENTS 5,568,641  10/1996  Nelson et al. ..................... 395/652 X
5,579,522  11/1996  Christeson et al. .................. 395/652
5,603,011   2/1997  Piazza ................................. 395/652
5,805,882   9/1998  Cooper et al. ...................... 395/652

Primary Examiner—Thomas M. Heckler
Attorney, Agent, or Firm—Ronald O. Neerings; Richard L. Donaldson

[57] ABSTRACT

A method (100) is provided for initializing a processing system. The method (100) includes a plurality of steps. Those steps are: loading a primary code block in a flash memory (104); loading an alternate code block in a secondary storage (106); testing the primary code block upon power up of the processing system (134); loading the primary code block from the flash memory into a shadow RAM if the primary code block is not defective (140); and loading the alternate code block from the secondary storage into the shadow RAM if the primary code block is defective (139).

20 Claims, 2 Drawing Sheets

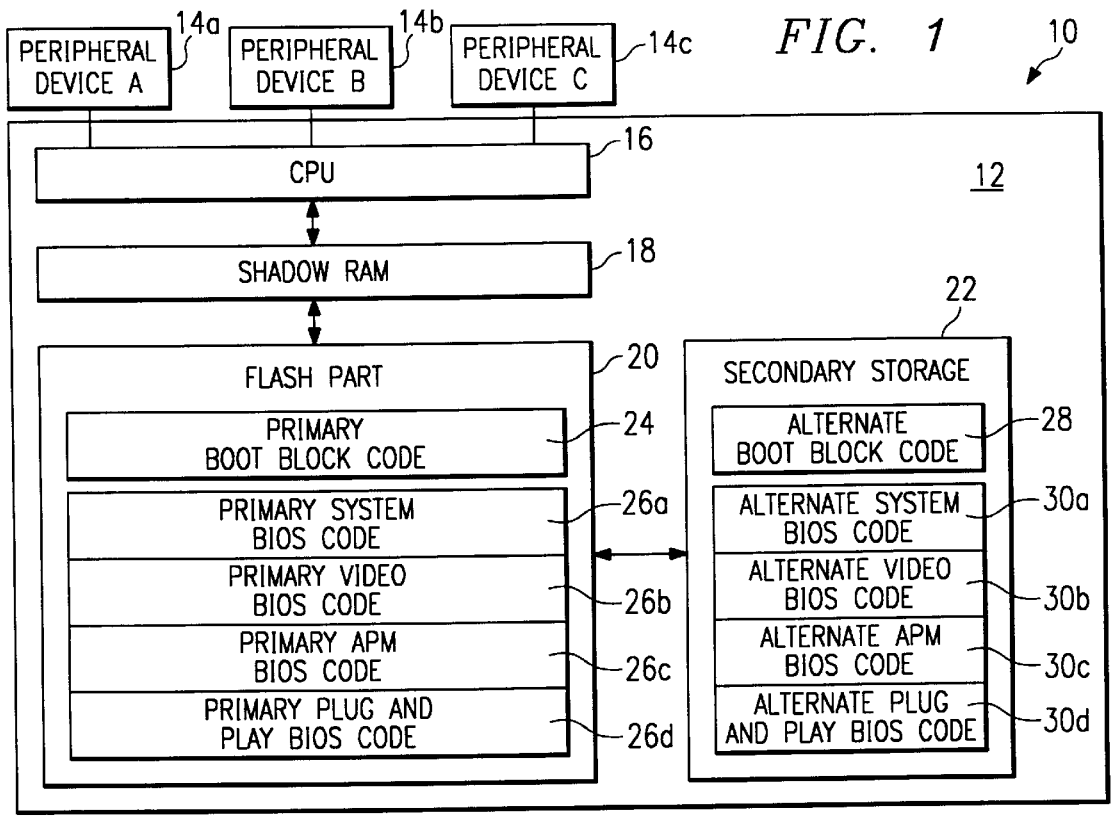
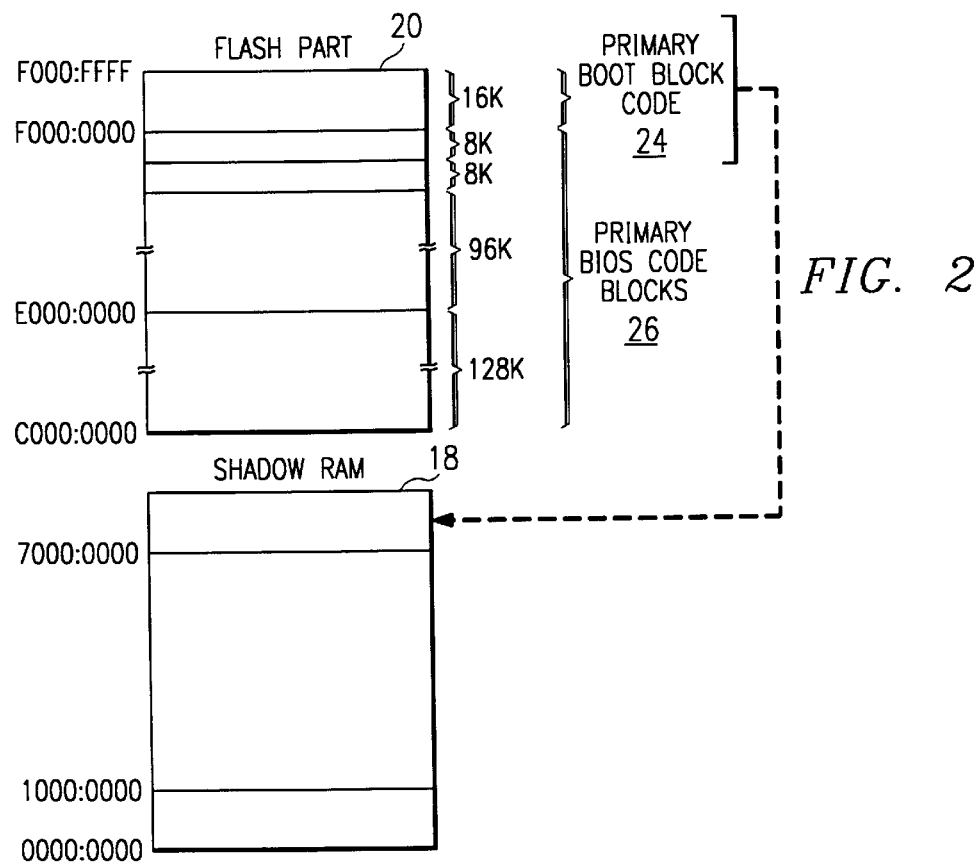

INITIALIZING A PROCESSING SYSTEM

TECHNICAL FIELD OF THE INVENTION

This invention relates generally to processing systems, and more particularly to initializing a processing system using a flash memory.

BACKGROUND OF THE INVENTION

In recent years, processing systems have developed rapidly. When a processing system is powered-up, certain components of the system must be initialized. The processing system retrieves instructions from initialization software or programs located within the system's memory.

The memory of a processing system typically may be differentiated into two types: main memory and secondary storage. The main memory is generally implemented as random access memory (RAM) or read only memory (ROM), which is relatively fast and capable of being read or written substantially in real time. Secondary storage is commonly implemented using a mechanical system employing a magnetic storage medium, such as a diskette or a hard drive. Compared to the main memory, access to the secondary storage is typically slow.

In prior initialization systems and methods, the initialization programs were stored in main memory. More specifically, initialization programs were stored in a one time programmable (OTP) ROM and loaded into a shadow RAM at power up of the processing system. However, these prior initialization systems were inflexible. In other words, if the initialization programs in the OTP ROM were defective, successful initialization of the processing system was impossible until the OTP ROM was replaced.

Accordingly, a need has arisen for an improved initialization system and method for initializing a processing system.

SUMMARY OF THE INVENTION

In accordance with the teachings of the present invention, the disadvantages and problems associated with previous techniques for initializing a processing system have been substantially reduced or eliminated.

According to an embodiment of the present invention, a method is provided for initializing a processing system. The method includes a plurality of steps. Those steps are: loading a primary code block in a flash memory; loading an alternate code block in a secondary storage; testing the primary code block upon power up of the processing system; loading the primary code block from the flash memory into a shadow RAM if the primary code block is not defective; and loading the alternate code block from the secondary storage into the shadow RAM if the primary code block is defective.

According to another embodiment of the present invention, a method is provided for initializing a processing system. The method includes a plurality of steps. Those steps are: loading a primary BIOS code block in a flash memory; loading an alternate BIOS code block in a secondary storage; accessing a boot block code upon power up of the processing system; testing the primary BIOS code block using the boot block code; loading the primary BIOS code block from the flash memory into a shadow RAM if the primary BIOS code block is not defective; and loading the alternate BIOS code block from the secondary storage into the shadow RAM if the primary BIOS code block is defective.

According to yet another embodiment of the present invention, an initialization system is provided for initializing a processing system. The initialization system includes a primary code block stored in a flash memory and an alternate code block stored on a secondary storage. A central processing unit, connected to the flash memory and the secondary storage, is operable to test the primary code block when the processing system is powered up. The central processing unit is further operable to load the primary code block into a shadow RAM if the primary code block is not defective. The central processing unit is further operable to load the alternate code block into the shadow RAM if the primary code block is defective.

Important technical advantages of the present invention include using a flash memory to provide more rapid access to a computer's main memory.

Another important technical advantage of the present invention includes providing alternate BIOS code blocks in case primary BIOS code blocks are invalid.

Yet another important technical advantage of the present invention includes providing a boot block code.

BRIEF DESCRIPTION OF THE DRAWINGS

For a more complete understanding of the present invention, and for further features and advantages, reference is now made to the following description taken in conjunction with the accompanying drawings, wherein like reference numerals represent like and corresponding parts, in which:

FIG. 1 is a schematic diagram of a processing system which includes an initialization system;

FIG. 2 illustrates the details of a memory map for the flash memory and shadow RAM shown in FIG. 1.

DETAILED DESCRIPTION OF THE INVENTION

Figure 3:
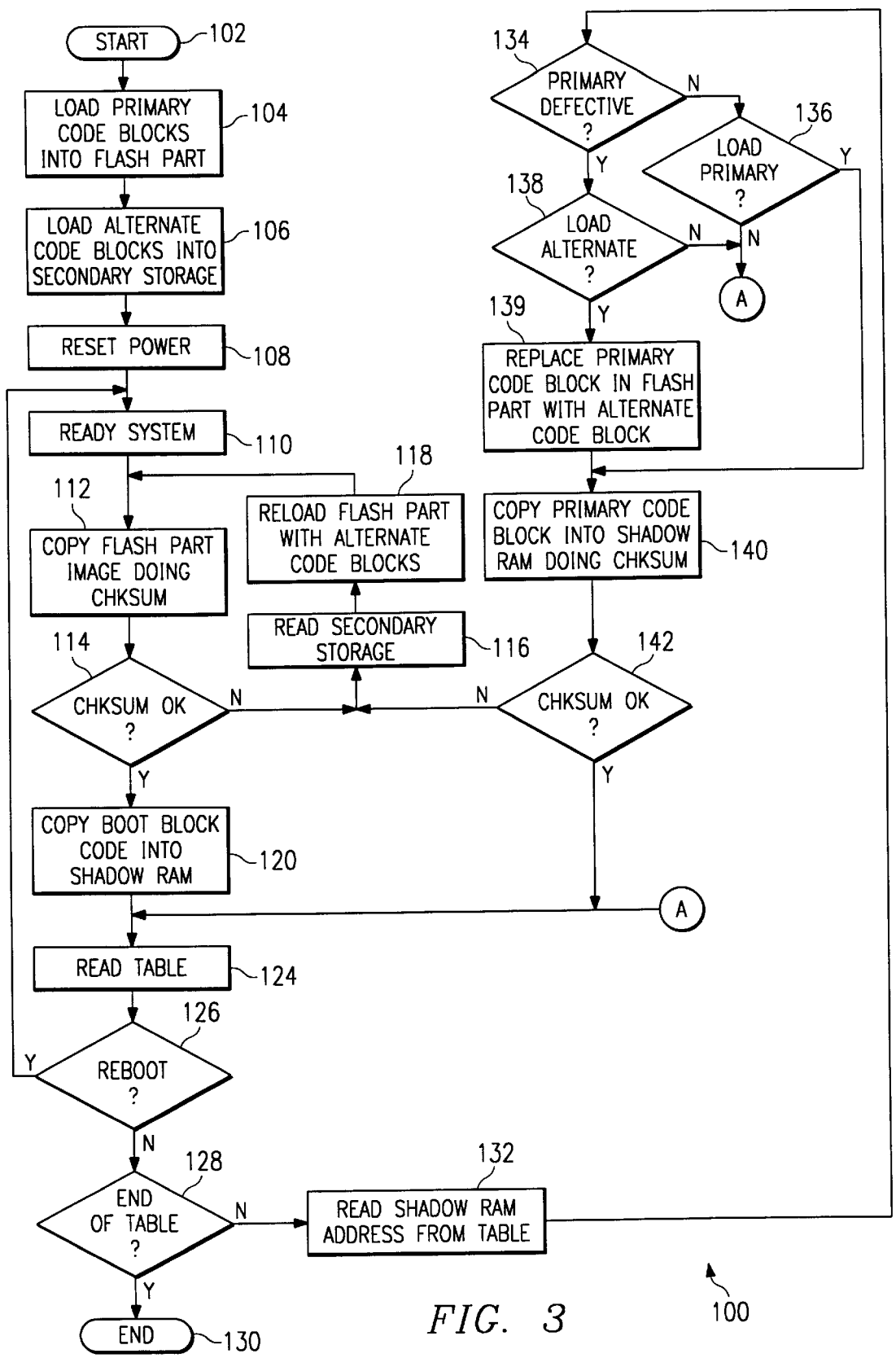
FIG. 3 is a flow diagram of a method for initializing a processing system.

The preferred embodiment of the present invention and its advantages are best understood by referring to FIGS. 1–3 of the drawings, like numerals being used for like and corresponding parts of the various drawings.

The present invention provides an initialization system and method for initializing a processing system. The initialization system and method provide a way of loading software code blocks into a shadow RAM upon power up of the processing system. Initially, primary code blocks are stored on a flash memory, such as a flash read only memory (flash ROM), and alternate code blocks are stored on a secondary storage medium, such as a floppy disk. The primary code blocks are tested. If the primary code blocks are not defective, they are loaded into the shadow RAM. On the other hand, if the primary code blocks are defective, the alternate code blocks are loaded into the shadow RAM. The primary code blocks in the flash memory may be replaced by the alternate code blocks, thereby providing flexibility and maximizing the usage of the flash memory.

FIG. 1 is a schematic diagram of a processing system 10 which includes an initialization system 12. Processing system 10 also includes one or more peripheral devices 14, such as a monitor or keyboard, labeled as 14a, 14b, and 14c.

Initialization system 12 initializes processing system 10 at power up. Initialization system 12 includes a central processing unit (CPU) 16, a shadow RAM 18, a flash memory 20, and a secondary storage 22. CPU 16 may be any computer processor, such as a "PENTIUM" processor manufactured and sold by Intel, Inc., that is operable to process data or information.

Shadow RAM 18 is connected to CPU 16. Shadow RAM 18 serves as main memory for CPU 16. CPU 16 reads the information contained in shadow RAM 18 when processing system 10 is initialized or booted. Shadow RAM 18 is relatively fast. In other words, data or information may be read out of and stored into shadow RAM 18 in substantially real time. Shadow RAM 18 may hold data or information in the range of 256K.

Flash memory 20 is connected to shadow RAM 18. Flash memory 20 may be a flash ROM, such as an Intel Flash Part. Flash memory 20 is relatively fast and may be part of main memory for processing system 10. Unlike the OTP ROM used in prior initialization systems, flash memory 20 can be reloaded with data and information. In other words, the data and information contained in flash memory 20 can be replaced with other information. Consequently, if the information stored in flash memory 20 is invalid or defective, flash memory 20 does not need to be replaced, but rather reloaded.

Flash memory 20 contains various primary blocks of code including a primary boot block code 24 and a plurality of primary BIOS code blocks 26, labeled as 26a, 26b, 26c, and 26d in FIG. 1. Both the boot block code and the BIOS code blocks are utilized by the processing system 10 during initialization. The boot block code is the code that is first retrieved by CPU 16 when processing system 10 is powered up or booted. The boot block code includes a table of addresses for the BIOS code blocks 26 that should be copied into shadow RAM 18 when the processing system is initialized.

The primary BIOS code blocks 26 may be related to such firmware applications as system BIOS, video BIOS, APM BIOS, and plug and play BIOS. Generally, the BIOS codes are used by CPU 12 to control any number of functions in processing system 10, such as video function or plug and play function. In FIG. 1, primary code blocks 26 are shown as primary system BIOS code block 26a, primary video BIOS code block 26b, primary APM BIOS code block 26c, and primary plug and play BIOS code block 26d. It should be understood that in alternative embodiments of the present invention, other primary code blocks 26 may be contained in flash memory 20 in addition to, or instead of, the primary code blocks shown.

Secondary storage 22 is connected to flash memory 20. Secondary storage 22 is auxiliary to the main memory of processing system 10. Information is moved by the processing system between the main memory and secondary storage 22 as needed. Secondary storage 22 is relatively slow compared to main memory, such as shadow RAM 18 and flash memory 20. In other words, data and information is stored into and read out of secondary storage less rapidly than for main memory. However, secondary storage is relatively inexpensive compared to main memory. Consequently, secondary storage 22 is used to store the bulk of information available to processing system 10. Secondary storage 22 may be in the form of disks and/or magnetic tape.

Secondary storage 22 contains alternate or back-up codes for the code blocks contained in flash memory 20. In other words, for each primary code block in flash memory 20, there is a corresponding alternate code block in secondary storage 22. Thus, secondary storage 22 contains an alternate boot block code 28 and alternate BIOS code blocks 30. In FIG. 1, the alternate BIOS code blocks 30 are shown as alternate system BIOS code block 30a, alternate video BIOS code block 30b, alternate APM BIOS code block 30c, and alternate plug and play BIOS code block 30d.

In addition to initialization system 12, processing system 10 also includes a plurality of peripheral devices 14. The peripheral devices 14 are connected to initialization system 12. In FIG. 1, these peripheral devices 14 are labeled as peripheral device A, peripheral device B, and peripheral device C. Peripheral devices 14 may include any of a variety of peripheral devices such as a monitor, a keyboard, a mouse, or any other device that can be attached to initialization system 12.

FIG. 2 illustrates details of flash memory 20 and shadow RAM 18 shown in FIG. 1, according to the preferred embodiment of the present invention. More specifically, FIG. 2 shows exemplary address locations for shadow RAM 18 and flash memory 20.

Flash memory 20 comprises the memory locations for processing system 10 corresponding to addresses C000:0000 to F000:FFFF. Primary boot block code 24 and primary BIOS code blocks 26 are initially stored in various memory locations of flash memory 20. For example, boot block code 24 may be stored in the memory locations corresponding to addresses F000:0000 to F000:FFFF. Likewise, each of the primary BIOS code blocks 26 may be stored in memory locations corresponding to addresses in the range of C000:0000 to FFFF:FFFF.

Shadow RAM 18 comprises the memory locations for processing system 10 beginning with address 0000:0000. As previously stated, the primary code blocks contained in flash memory 20 are loaded into the shadow RAM 18 upon initialization of processing system 10. More specifically, when processing system 10 is powered up, initialization system 12 "overlays" copies of the primary code blocks contained in flash memory 20 into the memory locations of shadow RAM 18.

FIG. 3 is a flow diagram for a method 100 for initializing a processing system according to a preferred embodiment of the present invention. Method 100 corresponds to the operation of initialization system 12. Accordingly, method 100 is best understood with reference to FIGS. 1 and 3.

At step 102, method 100 is started. At step 104, the primary code blocks, primary boot block code 24 and primary BIOS code blocks 26, are loaded into flash memory 20. The alternate code blocks, alternate boot block code 28 and alternate BIOS code blocks 30, are loaded into secondary storage 22 at step 106.

At step 108, method 100 resets power to the processing system 10. At step 110, the processing system 10 is placed into ready state. In other words, a chipset, shadow RAM 18, and peripheral devices, such as peripheral device A, peripheral device B, and peripheral device C, are initialized.

At step 112 an image of flash memory 20 is copied performing a checksum. At step 114, method 100 determines if the checksum result is correct. This step tests the overall validity of the primary code blocks contained in flash memory 20. If the checksum result is not correct, then at step 116, method 100 reads secondary storage 22. At step 118, flash memory 20 is reloaded with the alternate code blocks—alternate boot block code 28 and alternate BIOS codes blocks 30—from secondary storage 22. Method 100 then returns to step 112 where the image of flash memory 20 is copied performing a checksum.

Alternatively, if the checksum result is correct, method 100 proceeds to step 120 where primary boot block code 24 is copied into shadow RAM 18. The primary boot block code includes a table. At step 124, the table is read. The table describes how shadow RAM 18 should be constructed. In other words, the table lists the addresses for the BIOS code blocks 26 that should be copied into shadow RAM 18 when processing system 10 is initialized. As explained below, the table enables method 100 to test the validity of each primary BIOS code block 26 before that code block is copied into shadow RAM 18.

At step 126, method 100 determines whether processing system 10 should be rebooted. If the processing system 10 should be rebooted, method 100 returns to step 110 where processing system 10 is placed in ready state.

On the other hand, if processing system 10 does not need to be rebooted, method 100 proceeds to step 128 where it determines whether the end of the table has been reached. If the end of the table has been reached, then no additional BIOS code blocks needs to be copied into shadow RAM 18. Consequently, at step 130, method 100 ends. Otherwise, if the end of the table has not been reached, method 100 proceeds to step 132 where the address for a primary BIOS code block is read from the table.

At step 134, method 100 determines if the primary BIOS code block is defective. If the primary BIOS code block is not defective, method 100 proceeds to step 136 where it is determined whether the primary BIOS code block should be loaded. If the primary BIOS code block should be loaded, method 100 proceeds to step 140 where the BIOS code block is copied into shadow RAM 20 performing a checksum. If the primary BIOS code block should not be loaded, method 100 returns to step 124 where the table is read.

Alternatively, if it is determined at step 134 that the primary BIOS code block is defective, method 100 determines whether the corresponding alternate BIOS code block should be loaded at step 138. If the alternate BIOS code block should be loaded, method 100 replaces the primary BIOS code block in flash memory 20 with the corresponding alternate BIOS code block from secondary storage 22 at step 139. Method 100 then proceeds to step 140 where the primary BIOS code block is copied into shadow RAM 18 performing a checksum. Otherwise, if the alternate BIOS code block should not be loaded, method 100 returns to step 124 where the table is read.

At step 142, method 100 determines if the checksum result is correct. If the checksum is not correct, method 100 returns to step 116 where the secondary storage 22 is read. On the other hand, if checksum is correct, method 100 returns to step 124 where the table is read.

Although the present invention and its advantages have been described in detail, it should be understood that various changes, substitutions, and alterations can be made herein without departing from the spirit and scope of the invention as defined by the appended claims.

What is claimed is:

1. A method for initializing a processing system comprising the steps of:
    loading a primary code block in a relatively high speed flash memory;
    loading an alternate code block in a secondary relatively low speed storage;
    testing the primary code block upon power up of the processing system to determine whether the primary code block is defective;
    loading the primary code block from the flash memory into a shadow RAM if the primary code block in not defective; and
    loading the alternate code block from the secondary storage into the shadow RAM if the primary code block is defective.

2. The method of claim 1, wherein the step of loading an alternate code block comprises the step of loading on a secondary storage selected from the group comprising a floppy disk, a hard drive, a serial port, and a parallel port.

3. The method of claim 1, further comprising the step of sequentially searching a plurality of secondary storage media for the alternate code block.

4. The method of claim 1, wherein the step of testing comprises the step of verifying a checksum of the primary code block.

5. The method of claim 1, further comprising the step of invalidating the primary code block if the primary code block is defective.

6. The method of claim 1, further comprising the step of prompting a user of the processing system to reboot after the alternate code block has been loaded into the shadow RAM.

7. The method of claim 1, further comprising the step of replacing the primary code block in the flash memory with the alternate code block if the primary code block is defective.

8. The method of claim 1, wherein the steps of loading a primary code block and loading an alternate code block comprise the steps of:
    loading a primary boot block code in the flash memory; and
    loading an alternate boot block code in the secondary storage.

9. A method for initializing a processing system comprising the steps of:
    loading a primary BIOS code block in a relatively high speed flash memory;
    loading an alternate BIOS code block in a secondary relatively low speed storage;
    accessing a boot block code upon power up of the processing system;
    testing the primary BIOS code block using the boot block code to determine whether the BIOS code block is defective;
    loading the primary BIOS code block from the flash memory into a shadow RAM if the primary BIOS code block in not defective; and
    loading the alternate BIOS code block from the secondary storage into the shadow RAM if the primary BIOS code block is defective.

10. The method of claim 9, further comprising the step of replacing the primary BIOS code block in the flash memory with the alternate BIOS code block from the secondary storage if the primary BIOS code block is defective.

11. The method of claim 9, wherein the step of accessing the boot block code comprises the steps of:
    testing a primary boot block code;
    loading the primary boot block code into the shadow RAM if the primary boot block code is not defective; and
    loading an alternative boot block code into the shadow RAM if the primary boot block code is defective.

12. The method of claim 9, wherein the step of testing the primary BIOS code block comprises the step of examining a checksum of the primary BIOS code block.

13. The method of claim 9, further comprising the step of initializing the shadow RAM.

14. The method of claim 9, further comprising the steps of:
    loading a primary boot block code in the flash memory; and loading an alternate boot block code in the secondary storage.

15. The method of claim 9, further comprising the step of placing the processing system in a ready state.

16. An initialization system for initializing a processing system comprising:
   a relatively high speed flash memory;
   a primary code block stored in said flash memory;
   a relatively low speed secondary storage;
   an alternate code block stored in said secondary storage;
   a shadow RAM; and
   a central processing unit connected to said flash memory and said secondary storage for testing the primary code block when the processing system is powered up, loading the primary code block into said shadow RAM if the primary code block is not defective and loading the alternate code block into said shadow RAM if the primary code block is defective.

17. The initialization system of claim 16, wherein the primary code block includes a primary boot block code and the alternate code block includes an alternate boot block code.

18. The initialization system of claim 16, wherein the primary code block includes a primary BIOS code block and the alternate code block includes an alternate BIOS code block.

19. The initialization system of claim 16, wherein the secondary storage is a disk.

20. The initialization system of claim 16, wherein the flash memory is a flash ROM.

* * * * *

UNITED STATES PATENT AND TRADEMARK OFFICE
CERTIFICATE OF CORRECTION

PATENT NO. : 5,918,047
DATED : 06/29/99
INVENTOR(S) : Thomas P. Leavitt, and Kevin D. Davis It is certified that error appears in the above-identified patent and that said Letters Patent is hereby corrected as shown below:

Title page, insert the following item:
-- [60] Provisional application No. 60/010,615 filed January 26, 1996--.

Column 1, line 4, insert the following:
--CROSS REFERENCE TO RELATED APPLICATION Reference is made to and priority claimed from U.S. provisional application Ser. No.60/010,615 January 26, 1996--.

Signed and Sealed this

Seventh Day of March, 2000

Attest:

Q. TODD DICKINSON

*Attesting Officer*  *Commissioner of Patents and Trademarks*